United States Patent

Takano et al.

[11] Patent Number: 5,903,377
[45] Date of Patent: May 11, 1999

[54] SCANNING APPARATUS HAVING A CASCADE SCANNING OPTICAL SYSTEM

[75] Inventors: Masatoshi Takano; Eiji Takasugi, both of Saitama-ken; Shinji Kikuchi, Tokyo; Tsutomu Sato, Tokyo; Hiroyuki Saito, Tokyo; Yoshiyuki Araki; Mitsunori Iima, both of Saitama-ken; Takashi Sasaki, Nagano-ken; Takashi Iizuka, Saitama-ken, all of Japan

[73] Assignee: Asahi Kogaku Kogyo Kabushiki Kaisha, Tokyo, Japan

[21] Appl. No.: 09/001,559

[22] Filed: Dec. 31, 1997

[30] Foreign Application Priority Data

Jan. 14, 1997 [JP] Japan ..................................... 9-004653

[51] Int. Cl.[6] .................................................. G02B 26/08
[52] U.S. Cl. .......................... 359/201; 359/204; 359/212; 359/216
[58] Field of Search .................................... 359/201–205, 359/212, 216–219; 347/233, 235, 241–244; 250/234–236

[56] References Cited

FOREIGN PATENT DOCUMENTS 60-57316  1/1985  Japan .
60-35712  2/1985  Japan .
61-11720  1/1986  Japan .

OTHER PUBLICATIONS

Konica Technical Report vol. 9 (1996), along with an English language translation. (No Month).

Primary Examiner—James Phan
Attorney, Agent, or Firm—Greenblum & Bernstein, P.L.C.

[57] ABSTRACT

Disclosed is a scanning apparatus having a cascade scanning optical system. The scanning apparatus includes: a first scanning optical system for deflecting a first scanning laser beam to scan a scanning surface; a second scanning optical system for deflecting a second scanning laser beam to scan the scanning surface, wherein each of the first and second scanning optical systems is a telecentric system; a beam splitter positioned such that a first portion of the first scanning laser beam which has been reflected by the beam splitter and a first portion of the second scanning laser beam which has passed through the beam splitter proceed to the scanning surface on a common line thereon extending in a main scanning direction in respective different adjacent ranges of the common line to generate a single scanning line on the scanning surface by a combination of the first portion of the first scanning laser beam and the first portion of the second scanning laser beam; and a first laser beam detector fixed at a position to detect a second portion of the first scanning laser beam which has passed through the beam splitter and a second portion of the second scanning laser beam which has been reflected by the beam splitter when the first and second laser beams start scanning the respective different adjacent rang of the common line.

9 Claims, 7 Drawing Sheets

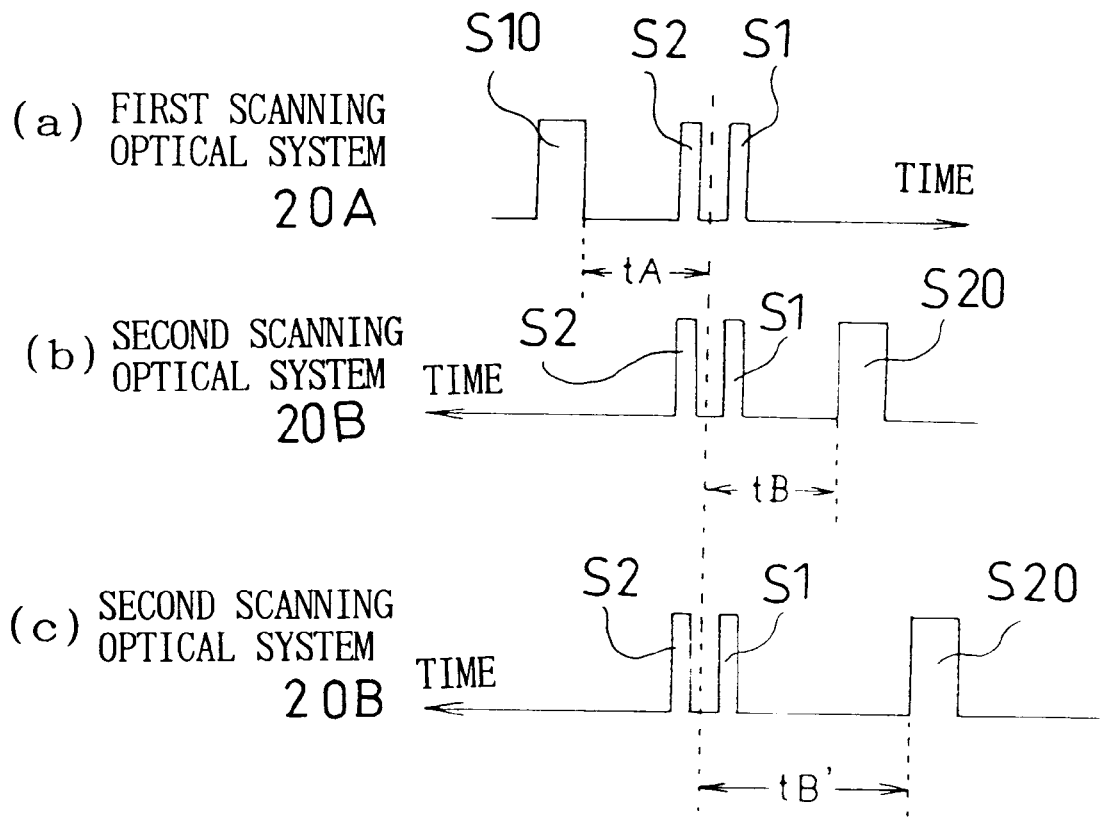

SCANNING APPARATUS HAVING A CASCADE SCANNING OPTICAL SYSTEM

BACKGROUND OF THE INVENTION

1. Field of the Invention

The present invention relates to a scanning apparatus having a cascade scanning optical system. The scanning apparatus is provided with a plurality of laser scanning optical systems which are arranged along the main scanning direction and controlled to operate in synchronization with each other so as to realize a wide scanning line.

2. Description of the Related Art

A cascade scanning optical system having a plurality of laser scanning optical systems arranged along the main scanning direction to realize a wide scanning line is known. Such a type of scanning optical system is disclosed in Japanese Laid-Open Patent Publication No. 60-35712 (published on Feb. 23, 1985) or Japanese Laid-Open Patent Publication No. 61-11720 (published on Jan. 20, 1986). Each publication discloses a cascade scanning optical system having a pair of laser scanning optical systems each having a laser beam emitter, a polygon mirror serving as a deflecting device, an fθ lens, etc. The pair of laser scanning optical systems are synchronously driven to emit respective scanning laser beams to a photoconductive surface (scanning surface) of a photoconductive drum on a common line thereon extending in parallel to the axial direction of the photoconductive drum, i.e., extending in the main scanning direction. The pair of scanning laser beams respectively scan two adjacent ranges of the common line on the photoconductive surface so as to scan the photoconductive surface of the photoconductive drum in the main scanning direction in a wide range.

There is a fundamental problem to be overcome in such a type of cascade scanning optical system. Namely, how can a scanning line, made on the photoconductive drum by the scanning laser beam emitted from one laser scanning optical system of the cascade scanning optical system, be accurately aligned with another scanning line, made on the photoconductive drum by the scanning laser beam emitted from another laser scanning optical system of the cascade scanning optical system, so that the scanning lines are not apart from each other nor overlap each other in the main scanning direction, i.e., so as to form a straight and continuous scanning line using a combination of the separate scanning lines.

In the case where each laser scanning optical system of the cascade scanning optical system is designed as a non-telecentric system through which the incident angle of a scanning laser beam relative to the photoconductive surface of the photoconductive drum varies in accordance with a variation in the position of a scanning spot of the scanning laser beam on the photoconductive surface in the main scanning direction, a scanning line made through one laser scanning optical system will not be precisely combined with another scanning line made through another laser scanning optical system on the photoconductive surface of the photoconductive drum, i.e., those scanning lines will be apart from each other or overlap each other by a certain amount in the main scanning direction if the photoconductive surface deviates from its original position even by a slight amount.

In the case where each laser scanning optical system of the cascade scanning optical system is designed as a telecentric system through which the scanning laser beam of each laser scanning optical system is always incident on the photoconductive surface in a direction perpendicular to an axial direction of the photoconductive drum, specifically in a direction orthogonal to generatrices of the photoconductive drum, the aforementioned problem in the case of the non-telecentric system will not occur, but it is necessary for each laser scanning optical system to be arranged at different positions in the sub-scanning direction to differentiate the angles of respective laser beams relative to the photoconductive surface, in order to prevent the respective laser beams from interfering with each other. However, with such an arrangement, if the photoconductive surface deviates from its original position even by a slight amount, a scanning line made through one laser scanning optical system and another scanning line made through another laser scanning optical system on the photoconductive drum will deviate from each other in the sub-scanning direction, and accordingly the former and latter scanning lines will not be combined with each other in the main scanning direction, so that a wide scanning line made by a combination of those scanning lines which extend in the main scanning direction across the photoconductive surface of the drum cannot be formed.

The cascade scanning optical system is generally provided, for each laser scanning optical system, with a laser beam detector fixed at a position to detect the scanning laser beam before the scanning laser beam starts generating a scanning line, so that the scanning-commencement position of writing of each scanning line on the photoconductive surface of the drum can be detected using the laser beam detector. Each scanning line starts to be generated upon a predetermined time interval having been elapsed from the moment at which the laser beam detector detects a scanning laser beam.

However, in the case where one or more laser beam detectors deviates from its original position due to a deformation of the casing to which the laser beam detector is secured, caused by, for instance, a variation in temperature, humidity, etc., the scanning-commencement position of writing of each scanning line on the photoconductive surface also deviates from its original position even if each scanning line starts to be generated upon a predetermined time interval having been elapsed from the moment at which the laser beam detector detects a scanning laser beam. Japanese Laid-Open Patent Publication No. 60-35712 (published on Feb. 23, 1985) discloses a way to overcome such a problem by an arrangement in which only one laser beam detector is provided. Such an arrangement is effective in the case where the laser beam detector deviates from its original position in a direction parallel to the main scanning direction. However, the arrangement is ineffective in the case where the laser beam detector deviates from its original position in a direction non-parallel to the main scanning direction.

SUMMARY OF THE INVENTION

The primary object of the present invention is to provide a scanning apparatus having a cascade scanning optical system in which a scanning line, made by the scanning laser beam emitted from one laser scanning optical system, and another scanning line, made by the scanning laser beam emitted by another laser scanning optical system, will not be apart from each other or overlap each other in the main scanning direction on a scanning surface.

To achieve the object mentioned above, according to an aspect of the present invention, there is provided a scanning apparatus having a cascade scanning optical system. The scanning apparatus includes: a first scanning optical system for deflecting a first scanning laser beam to scan a scanning surface; a second scanning optical system for deflecting a second scanning laser beam to scan the scanning surface, wherein each of the first and second scanning optical systems is a telecentric system; a beam splitter positioned such that a first portion of the first scanning laser beam which has been reflected by the beam splitter and a first portion of the second scanning laser beam which has passed through the beam splitter proceed to the scanning surface on a common line thereon extending in a main scanning direction in respective different adjacent ranges of the common line to generate a single scanning line on the scanning surface by a combination of the first portion of the first scanning laser beam and the first portion of the second scanning laser beam; and a first laser beam detector fixed at a position to detect a second portion of the first scanning laser beam which has passed through the beam splitter and a second portion of the second scanning laser beam which has been reflected by the beam splitter when the first and second laser beams start scanning the respective different adjacent ranges of the common line.

Preferably, the first laser beam detector includes a light interceptive plate positioned in front of a light detecting surface of the first laser beam detector, wherein the light interceptive plate includes two parallel slits which are positioned lie on a line extending in parallel to the main scanning direction.

Preferably, the two parallel slits extend in a direction normal to the main scanning direction.

Preferably, the scanning apparatus further includes a drum having the scanning surface on a periphery of the drum.

Preferably, the scanning apparatus further includes: a second laser beam detector fixed at a position to detect the first scanning laser beam before the first scanning laser beam starts scanning one of the respective different adjacent ranges of the common line; a third laser beam detector fixed at a position to detect the second scanning laser beam before the second scanning laser beam starts scanning the other of the respective different adjacent ranges of the common line; a first counter which starts counting at the moment the second laser beam detector detects the first scanning laser beam and subsequently stops counting at the moment the first laser beam detector detects the first scanning laser beam to output a first counted time value; a second counter which starts counting at the moment the first laser beam detector detects the second scanning laser beam and subsequently stops counting at the moment the third laser beam detector detects the second scanning laser beam to output a second counted time value; and a controller for adjusting a first position on the scanning surface at which the first scanning laser beam starts generating a first scanning line in one of the respective different adjacent ranges of the common line, in accordance with the first counted time value, and for adjusting a second position on the scanning surface at which the second scanning laser beam starts generating a second scanning line in the other of the respective different adjacent ranges of the common line, in accordance with the second counted time value, the first and second scanning lines together forming the single scanning line.

Preferably, the scanning apparatus further includes a mirror positioned adjacent to the beam splitter to reflect the second scanning laser beam towards one side of the beam splitter in a first direction, wherein the first scanning optical system is arranged relative to the second scanning optical system such that the first scanning laser beam is incident on another side of the beam splitter in a second direction perpendicular to the first direction.

Preferably, the first and second laser scanning optical systems are composed of the same optical elements.

Preferably, the first and second laser scanning optical systems are arranged in parallel to each other.

Preferably, the first scanning optical system includes a first polygon mirror for deflecting the first scanning laser beam, and wherein the second scanning optical system includes a second polygon mirror for deflecting the second scanning laser beam.

The present disclosure relates to subject matter contained in Japanese Patent Application No. 9-4653 (filed on Jan. 14, 1997) which is expressly incorporated herein by reference in its entirety.

BRIEF DESCRIPTION OF THE DRAWINGS

The invention will be described below in detail with reference to the accompanying drawings in which:

FIG. 7 is a time chart showing timings of signals output from laser beam detectors.

DESCRIPTION OF THE PREFERRED EMBODIMENTS

FIGS. 1 through 4 show an embodiment of a cascade scanning optical system for scanning the photoconductive surface of a photoconductive drum (rotating member) 10 provided in a laser-beam printer (scanning apparatus). The cascade scanning optical system is provided with a pair of laser scanning optical systems, i.e., a first scanning optical system 20A and a second scanning optical system 20B. The first and second scanning optical systems 20A and 20B are provided with the same optical elements or parts, that is, the first scanning optical system 20A is provided with a laser collimating unit 21A serving as a laser beam emitter, a cylindrical lens 19A, a polygon mirror 22A, an fθ lens group 23A and a condenser lens 24A, while the second scanning optical system 20B is provided with a laser collimating unit 21B serving as a laser beam emitter, a cylindrical lens 19B, a polygon mirror 22B, an fθ lens group 23B and a condenser lens 24B. Each of the fθ lens groups 23A and 23B consists of two lens elements as can be seen from FIG. 1 or 2. The laser beam emitted from the laser collimating unit 21A passes through the cylindrical lens 19A to be incident on the polygon mirror 22A while the laser beam emitted from the laser collimating unit 21B passes through the cylindrical lens 19B to be incident on the polygon mirror 22B. These two laser beams deflected by the polygon mirrors 22A and 22B scan respective different surfaces adjacent to each other onto the photoconductive surface of the drum 10 on a common line extending in the axial direction of the drum 10. Namely, half of the scanning line formed on the photoconductive surface of the drum 10 is scanned by the laser beam emitted from the laser collimating unit 21A and the other half of the scanning line formed on the photoconductive surface of the drum 10 is scanned by the laser beam emitted from the laser collimating unit 21B, as can be seen from FIG. 1.

The first and second scanning optical systems 20A and 20B are respectively supported by casings 25A and 25B which are arranged in parallel to each other and apart from each other both in a vertical direction (the vertical direction as viewed in FIG. 3) and also in the axial direction of the drum 10. Further, the casings 25A and 25B are arranged at different positions in the horizontal direction as viewed in FIG. 3.

Figure 2:
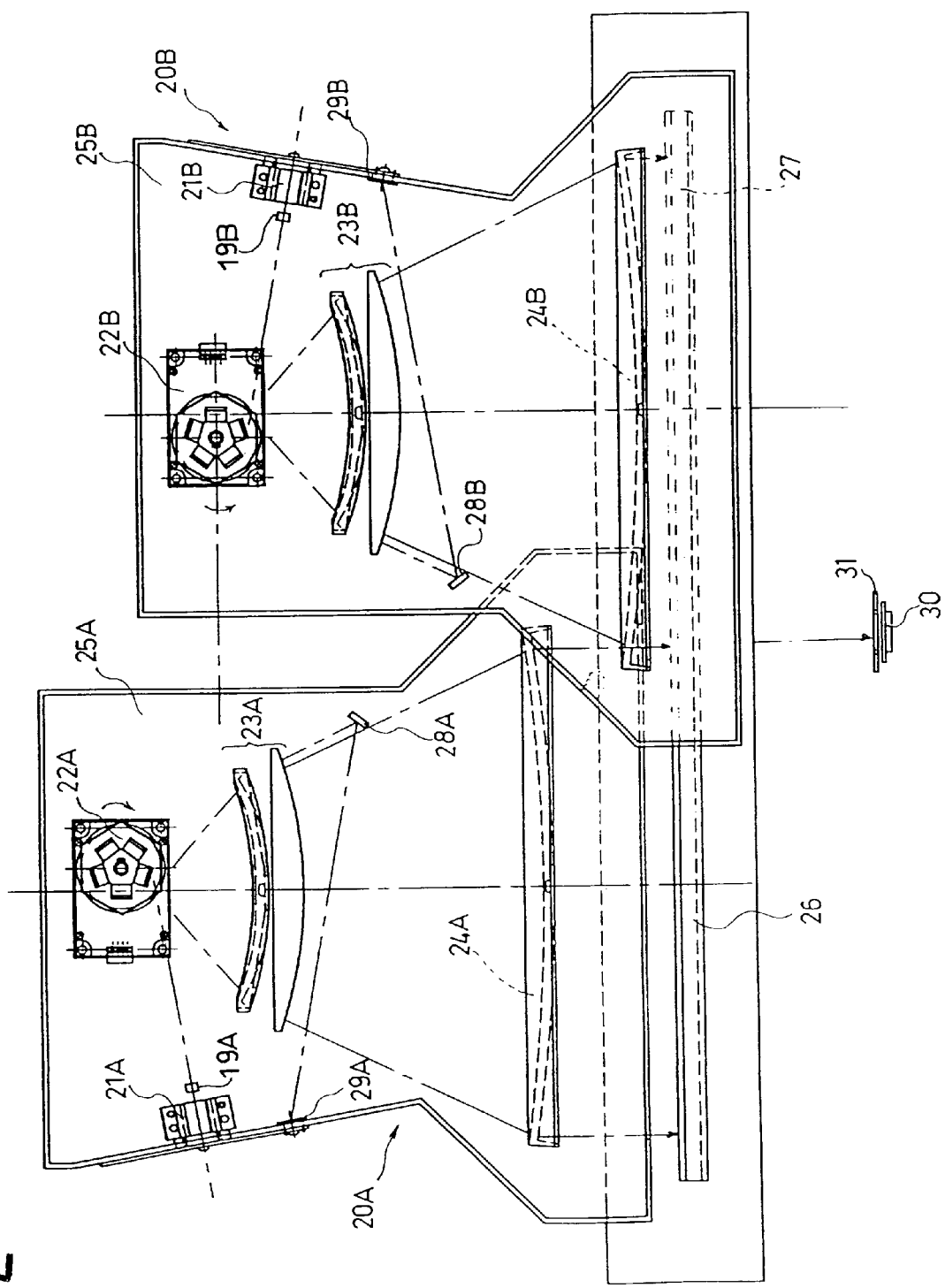
FIG. 2 is a plan view of the cascade scanning optical system shown in FIG. 1.

There is provided an elongated fixed half mirror 26 serving as a beam splitter which extends along the first and second scanning optical systems 20A and 20B in the main scanning direction (right and left direction as viewed in FIG. 2). The half mirror 26 is positioned in front of the condenser lens 24A (i.e. on the right side of the condenser lens 24A as viewed in FIG. 3) such that the beam splitting surface of the half mirror 26 is angled relative to an optical path of the scanning laser beam between the condenser lens 24A and the half mirror 26 by approximately 45°, so that the scanning laser beam emitted from the condenser lens 24A is incident on one side of the half mirror 26 (first side). The scanning laser beam emitted from the condenser lens 24A is directly incident upon the half mirror 26, and part of the incident scanning laser beam passes through the half mirror 26 while the remaining part is reflected by the half mirror 26 to be incident on the photoconductive surface of the drum 10.

Figure 3:
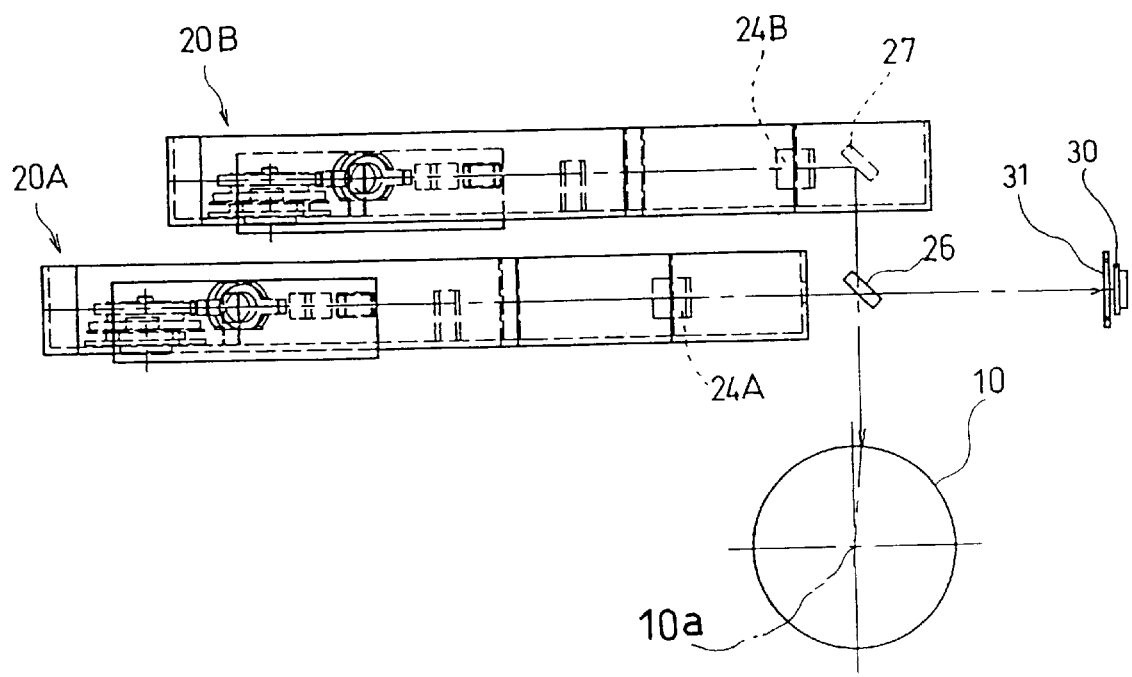
FIG. 3 is a side view of the cascade scanning optical system shown in FIG. 1, as viewed from the left of FIG. 2.
Figure 4:
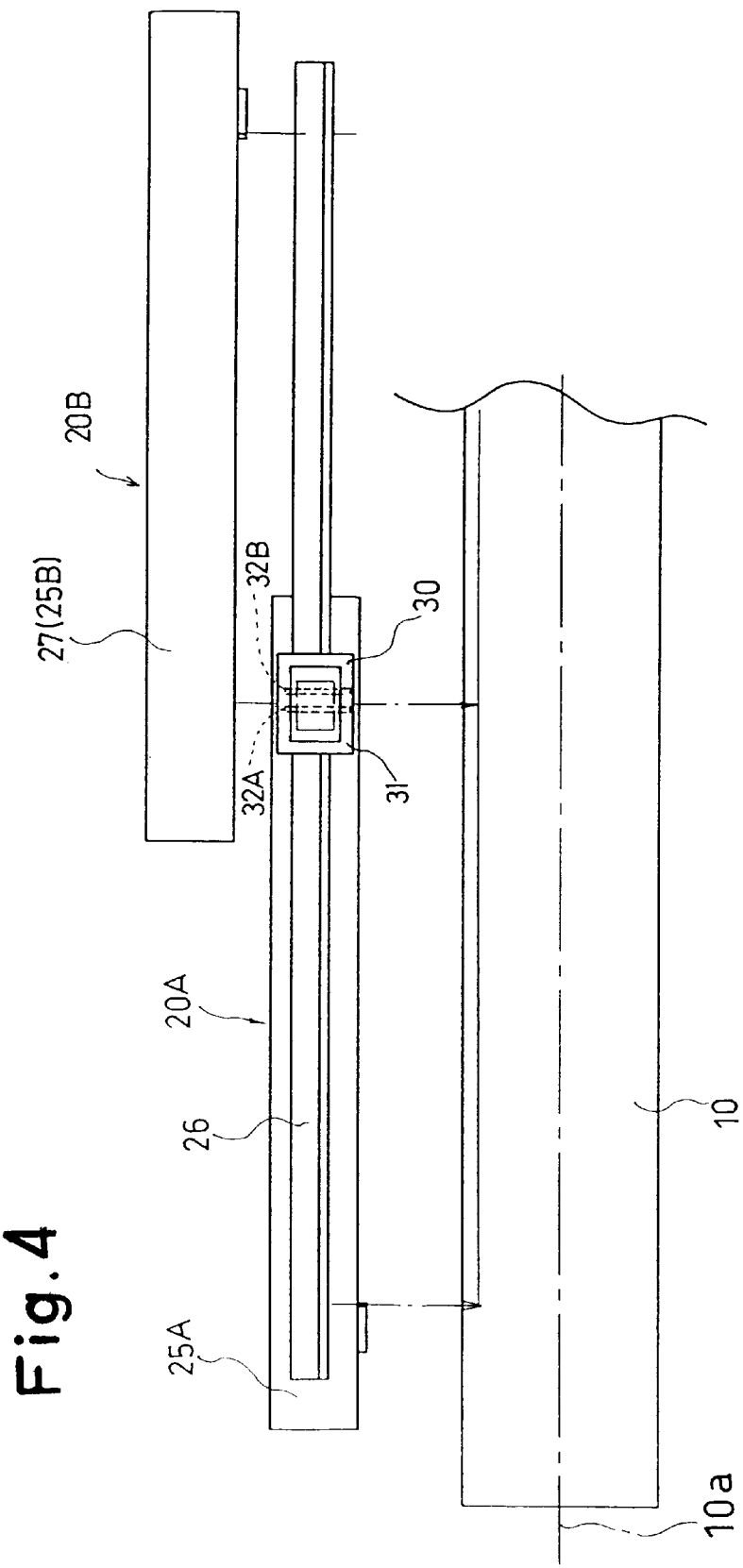
FIG. 4 is a front view of the cascade scanning optical system shown in FIG. 1, as viewed from the lower side of FIG. 2.
Figure 5:
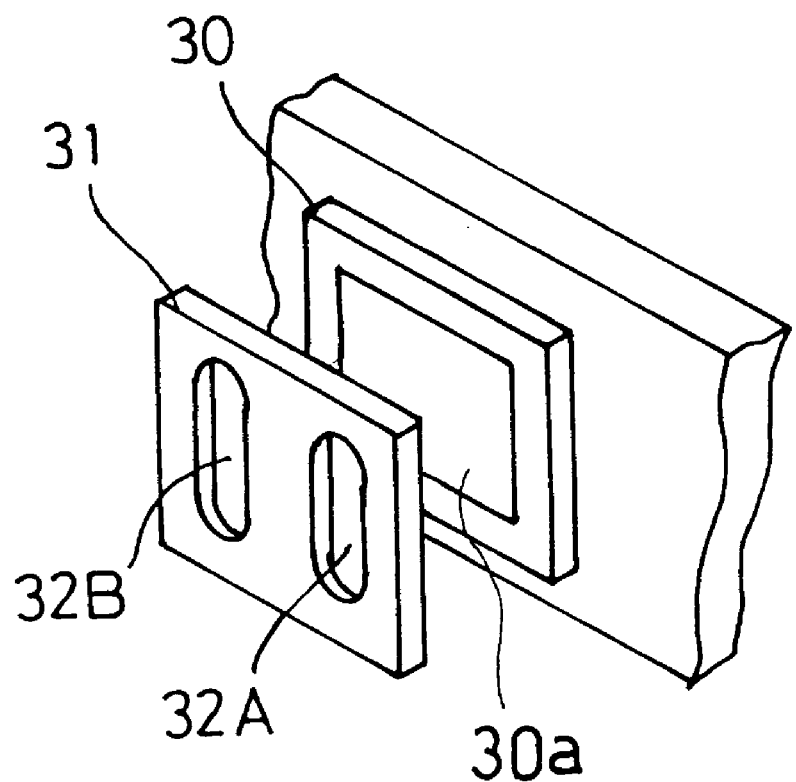
FIG. 5 is an exploded perspective view of a laser beam detector for detecting a border between a pair of scanning lines.

There is provided a fixed elongated mirror 27 which extends in parallel to the half mirror 26 in the main scanning direction and is positioned above the half mirror 26 in front of the condenser lens 24B (i.e. on the right side of the condenser lens 24B as viewed in FIG. 3) such that the reflecting surface of the mirror 27 is angled relative to an optical path of the scanning laser beam between the condenser lens 24B and the mirror 27 by approximately 45°, so that the scanning laser beam reflected by the mirror 27 is incident on the other side of the half mirror 26 (second side). The scanning laser beam emitted from the condenser lens 24B is directly incident upon the mirror 27 to be totally reflected thereby to enter the half mirror 26. The scanning laser beam emitted from the condenser lens 24B to be totally reflected by the mirror 27 is incident upon the half mirror 26 in a direction orthogonal to the scanning laser beam emitted from the condenser lens 24A (i.e., the laser beam emitted from the first scanning optical system 20A) to the half mirror 26. The mirror 27 is supported by the casing 25B while the half mirror 26 is supported by a supporting member (not shown) fixed relative to both the casings 25A and 25B.

Figure 1:
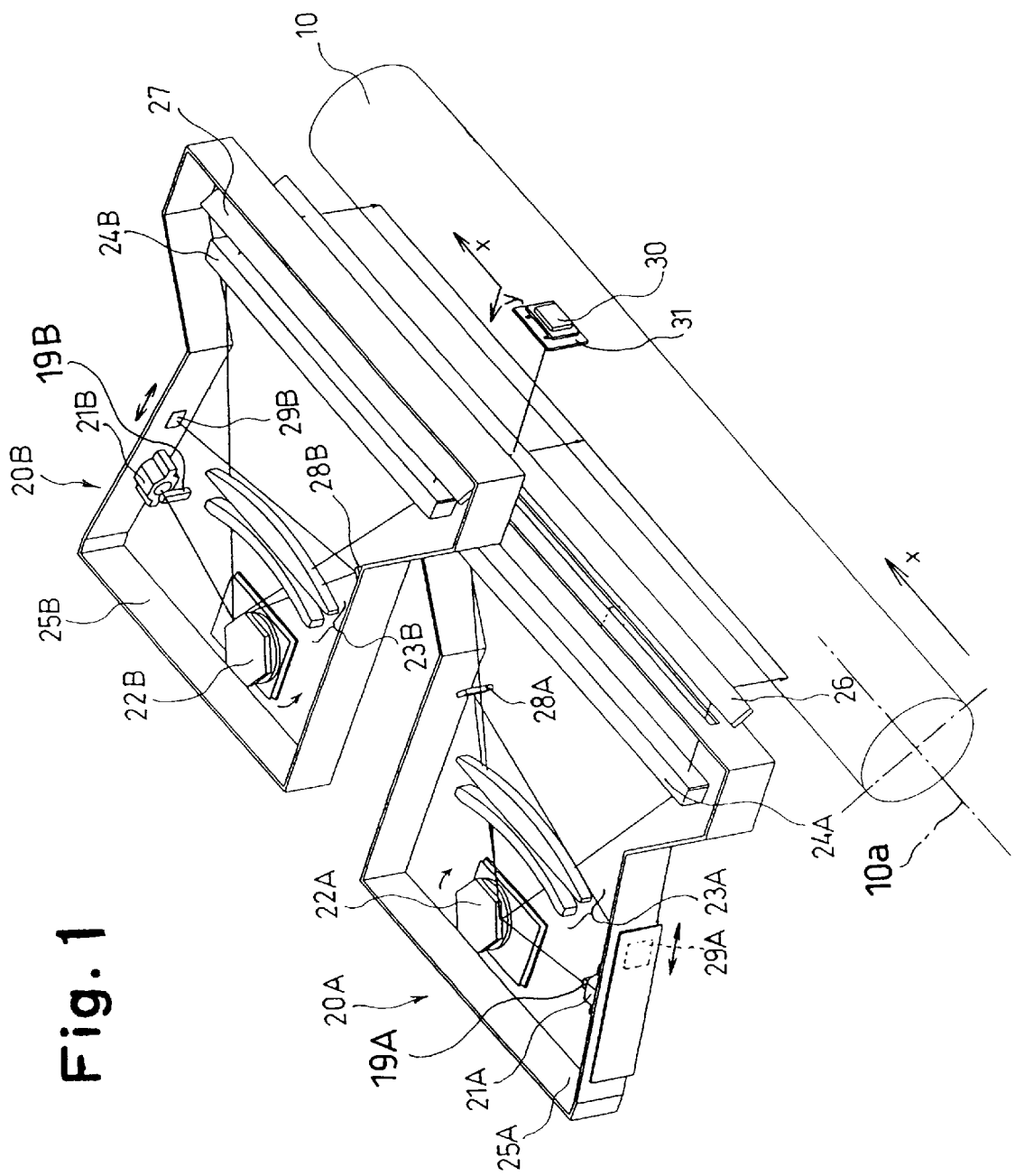
FIG. 1 is a perspective view of a first embodiment of a cascade scanning optical system to which the present invention is applied, showing only fundamental elements thereof.

As shown in FIG. 1, the length of the mirror 27 is sufficient to receive the scanning laser beam emitted from the condenser lens 24B, while the length of the half mirror 26 is much longer than that of the mirror 27, approximately double the length of the mirror 27, to receive both scanning laser beams emitted from the first and second scanning optical systems 20A and 20B.

The laser beam deflected by the polygon mirror 22A, is converged by the fθ lens group 23A in the main and subscanning directions. This converged laser beam is then projected to the half mirror 26 through the condenser lens 24A such that any laser beam emitted from condenser lens 24A to the half mirror 26 extends in parallel to the optical axis of the fθ lens group 23A under the condition that "θ" is equal to zero (θ=0) in the equation "y=fθ" which shows the fθ lens characteristic.

Similarly, the laser beam deflected by the polygon mirror 22B is converged by the fθ lens group 23B in the main and sub-scanning directions. This converged laser beam is then projected to the mirror 27 through the condenser lens 24B such that any laser beam emitted from condenser lens 24B to the mirror 27 extends in parallel to the optical axis of the fθ lens group 23B under the condition that "θ" is equal to zero (θ=0) in the equation "y=fθ" which shows the fθ lens characteristic.

According to the above arrangement, the scanning laser beam emitted from the condenser lens 24A to be partly reflected by the half mirror 26 and the other scanning laser beam emitted from the condenser lens 24B to be reflected by the mirror 27 and partly passing through the half mirror 26, each proceed in a common plane to be always incident upon the photoconductive surface of the drum 10 in a direction perpendicular to a rotational axis 10a of the drum 10 (i.e., in a direction perpendicular to the axial direction of the drum 10), specifically in a direction orthogonal to generatrices of the drum 10.

Accordingly, the scanning laser beam emitted from the first scanning optical system 20A and the other scanning laser beam emitted from the second scanning optical system 20B are each projected onto the photoconductive surface of the drum 10 through the half mirror 26 and the mirror 27 on a common line extending in the axial direction of the drum 10 in respective different adjacent ranges of the common line to thereby generate a straight and continuous wide scanning line on the photoconductive surface of the drum 10.

The polygon mirror 22A rotates in a clockwise direction while the polygon mirror 22B rotates in a counterclockwise direction, as viewed in FIG. 2. Namely, the polygon mirrors 22A and 22B rotate in opposite rotational directions to scan the photoconductive surface of the drum 10 from its approximate center toward respective opposite ends in opposite directions. A mirror 28A, provided in the casing 25A, is fixed at a position to receive the scanning laser beam emitted from the fθ lens group 23A before the scanning laser beam is incident on the photoconductive surface of the drum 10 through the half mirror 26 at each scanning sweep while the polygon mirror 22A rotates. The scanning laser beam reflected by the mirror 28A is incident on a laser beam detector 29A, provided in the casing 25A, which is fixed at a position opposite to the mirror 28A. Likewise, a mirror 28B, provided in the casing 25B, is fixed at a position to receive the scanning laser beam emitted from the fθ lens group 23B before the scanning laser beam is incident on the photoconductive surface of the drum 10 through the mirror 27 and the half mirror 26 at each scanning sweep while the polygon mirror 22B rotates. The scanning laser beam reflected by the mirror 28B is incident on a laser beam detector 29B, provided in the casing 25B, which is fixed at a position opposite to the mirror 28B. A laser beam detector 30, provided in front of the half mirror 26, i.e. on the right side thereof as viewed in FIG. 3, is fixed at a position to correspond to the opposing ends of condenser lenses 24A and 24B, whose ends oppose other as viewed in FIG. 2. The laser beam detector 30 is used to determine a border between the scanning laser beam emitted by the first scanning optical system 20A towards the drum 10 and the scanning laser beam emitted by the second scanning optical system 20B towards the drum 10. In other words, the laser beam detector 30 is used so that opposing ends of the pair of scanning lines made by the first and second scanning optical systems 20A and 20B are not apart from each other nor overlap each other on the photoconductive surface of the drum 10, respectively.

As shown in FIG. 3, the scanning laser beam emitted from the condenser lens 24A to be partly passed through the half mirror 26 (hereinafter referred to as "first scanning laser beam") and the scanning laser beam emitted from the condenser lens 24B reflected by the mirror 27 to be partly reflected by the half mirror 26 (hereinafter referred to as "second scanning laser beam") are each incident upon the laser beam detector 30 when the first and second scanning laser beams begin scanning the respective different adjacent ranges of the common line on the photoconductive surface of the drum 10.

The laser beam detector 30 is provided with a light-interceptive plate 31 positioned in front of a light detecting surface 30a of the laser beam detector 30. The light-interceptive plate 31 is provided with two parallel slits 32A and 32B which lie on a line extending in the main scanning direction (in the horizontal direction as viewed in FIG. 2 or 4). Each of the slits 32A and 32B extends in the vertical direction (as viewed in FIG. 3 or 4), namely, in a direction normal to the main scanning direction. The first scanning laser beam is incident on the light detecting surface 30a firstly through the slit 32B and subsequently through the slit 32A at each scanning weep made by the first scanning laser beam whereas the second scanning laser beam is incident on the light detecting surface 30a firstly through the slit 32A and subsequently through the slit 32B at each scanning weep made by the second scanning laser beam. The laser beam detector 30 outputs first and second signals S1 and S2 (see FIG. 7) when receiving a laser beam incident on the light detecting surface 30a through the slits 32A and 32B, respectively. The laser beam detector 30 is arranged such that the center between the slits 32A and 32B correspond to the aforementioned border between the scanning laser beam emitted by the first scanning optical system 20A towards the drum 10 and the scanning laser beam emitted by the second scanning optical system 20A towards the drum 10.

The laser collimating units 21A and 21B are each controlled to turn its laser emission ON or OFF in accordance with given image data to draw a corresponding image (charge-latent image) on the photoconductive surface of the drum 10, and subsequently the image drawn on the photoconductive surface of the drum 10 is transferred to plain paper according to a conventional electrophotographic method.

Figure 6:
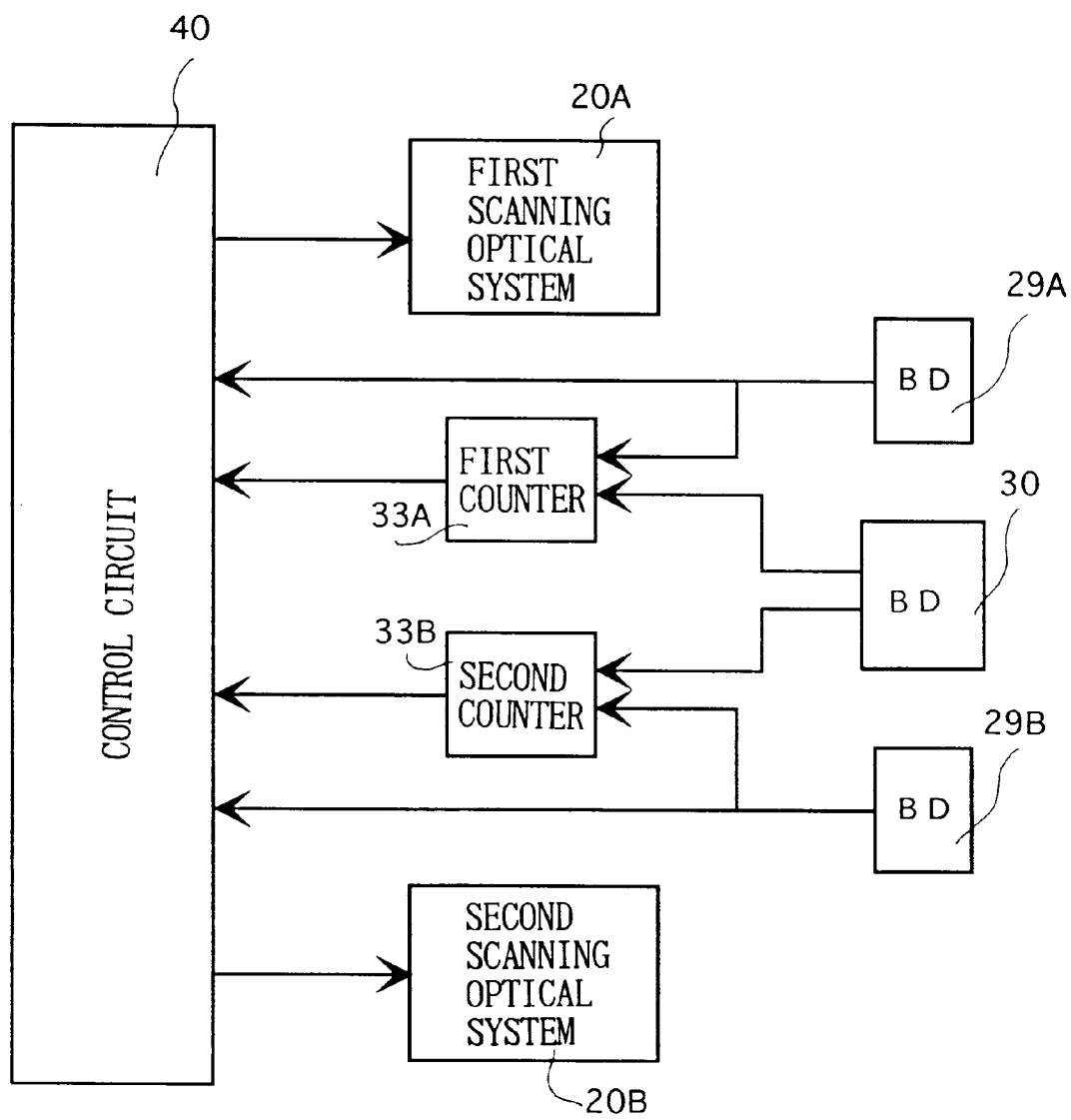
FIG. 6 is a block diagram of an embodiment of a circuit for determining a time interval by which the commencement of the writing of each scanning line is delayed, showing only fundamental elements of the circuit.

FIG. 6 shows an embodiment of a circuit for determining a time interval by which the commencement of writing of each scanning line is delayed for each of the first and second scanning optical systems 20A and 20B. The signal output from the laser beam detector 29A is input to a first counter 33A and a control circuit 40, while the signal output from the laser beam detector 29B is input to a second counter 33B and the control circuit 40. The signal output from the laser beam detector 30 is input to each of the first and second counters 33A and 33B. The first counter 33A starts counting upon receiving a signal from the laser beam detector 29A and subsequently stops counting upon receiving a signal from the laser beam detector 30 to output the counted time value (first counted time value) to the control circuit 40. Similarly, the second counter 33B starts counting upon receiving a signal from the laser beam detector 29B and subsequently stops counting upon receiving a signal from the laser beam detector 30 to output the counted time value (second counted time value) to the control circuit 40. The control circuit 40 determines a time interval (first time-delay value) by which the commencement of writing of each scanning line is delayed for the first scanning optical system 20A, in accordance with the first counted time value, and at the same time determines another time interval (second time-delay value) by which the commencement of writing of each scanning line is delayed for the second scanning optical system 20B, in accordance with the second counted time value. The control circuit 40 stores the values of the two determined time intervals (first and second time-delay values) in a RAM (not shown) provided in the control circuit 40. When performing a scanning operation, the control circuit 40 controls the emission of each of the laser collimating unit 21A and 21B, using the value of the corresponding determined time interval stored in the RAM in order to delay the commencement of writing of each scanning line by the determined time interval. The polygon mirrors 22A and 22B are synchronously controlled, each rotating at a constant rotational speed by a control circuit (not shown).

FIG. 7 shows a time chart showing timings of signals generated by the laser beam detectors 29A, 29B and 30. S1 represents a signal generated by the laser beam detector 30 when it detects a laser beam through the slit 32A. S2 represents a signal generated by the laser beam detector 30 when it detects a laser beam through the slit 32B. S10 represents a signal generated by the laser beam detector 29A when it detects a laser beam. S20 represents a signal generated by the laser beam detector 29B when it detects a laser beam. tA represents a time interval (which corresponds to the aforementioned first counted time value) between the moment at which the laser beam detector 29A detects the scanning laser beam emitted from the condenser lens 24A through the half mirror 26 and the following moment at which the laser beam detector 30 detects the same scanning laser beam. tB represents a time interval (which corresponds to the aforementioned second counted time value) between the moment at which the laser beam detector 29B detects the scanning laser beam emitted from the condenser lens 24B through the mirror 27 and the half mirror 26 and the following moment at which the laser beam detector 30 detects the same scanning laser beam.

As can be appreciated from the time chart shown in FIG. 7, the control circuit 40 is able to determine an appropriate scanning-commencement position of writing of each scanning line for the first scanning optical system 20A on the drum 10, by measuring the time interval tA through the counter 33A and using the value of the measured time interval tA as a time interval by which the commencement of the writing of each scanning line is delayed for the first scanning optical system 20A. The control circuit 40 is also able to determine an appropriate scanning-commencement position of writing of each scanning line for the second scanning optical system 20B on the drum 10, by measuring the time interval tB through the counter 33B and using the value of the measured time interval tB as a time interval by which the commencement of the writing of each scanning line is delayed for the second scanning optical system 20B. Using the time intervals tA and tB as time intervals for the first and second scanning optical systems 20A and 20B in such a manner, opposing ends of the pair of scanning lines which are to be connected at a point of joining therebetween are effectively prevented from being apart from each other or overlapping each other in the main scanning direction on the photoconductive surface of the drum 10.

FIG. 7(c) shows a case where the time interval tB' has become longer than the time interval tB (namely, a case where the distance between the laser beam detector 29B and the laser beam detector 30 has become longer) because of, for instance, a deformation of the casing 25B due to a variation of temperature, humidity, etc. Even in such a case shown in FIG. 7(c), the scanning-commencement position of writing of each scanning line for the second scanning optical system 20B on the drum 10 is maintained by using the time interval tB' as a time interval by which the commencement of the writing of each scanning line is delayed for the second scanning optical system 20B.

According to the present embodiment, even if the laser beam detector 30 deviates from its original position along an axis X shown in FIG. 1 which extends in parallel to the main scanning direction, opposing ends of the pair of scanning laser beams respectively made by the first and second scanning optical systems 20A and 20B will not be apart from nor overlap each other in the main scanning direction since the border between the scanning laser beam emitted by the first scanning optical system 20A towards the drum 10 and the scanning laser beam emitted by the second scanning optical system 20A towards the drum 10 also deviates simultaneously in the same direction, namely, the respective scanning-commencement positions of writing of each scanning line for the first and second scanning optical systems 20A and 20B on the drum 10 also deviate in the same direction together with the laser beam detector 30.

Considering the fact that the diameter of a scanning spot of each of the first and second scanning laser beams incident on the laser beam detector 30 is fairly small as compared with the area of the light detecting surface 30a, each of the slits 32A and 32B is formed on the light interceptive plate 32 to have a fairly short width in order to improve the precision of the position of detection of the laser beam detector 30 while realizing to detect the first and second scanning laser beams simultaneously. If there was only one slit formed on the light interceptive plate 32, it would be impossible to judge which of the first or second scanning optical systems 20A or 20B the detected laser beam was emitted by. However, the light interceptive plate 32 is provided with the two slits 32A and 32B, making it possible to judge whether the detected laser beam was emitted by the first scanning optical system 20A or the second scanning optical system 20B.

In the present embodiment of the scanning apparatus, at any time after the power switch is turned ON before the scanning operation is actuated, the control circuit 40 determines first and second time intervals (first and second time-delay values) for the first and second scanning optical systems 20A and 20B, and stores the first and second time-delay values in the RAM in the control circuit 40. After the first and second time-delay values have been stored in the RAM, the laser collimating units 21A and 21B are each turned OFF to fall into an idle mode or a waiting mode.

As can be understood from the foregoing, according to the present embodiment, the first and second time intervals (first and second time-delay values) are each properly adjusted with the use of the laser beam detectors 29A, 29B and 30 such that the scanning-commencement position of writing of each scanning line made by the first scanning optical system 20A and the scanning-commencement position of writing of each scanning line made by the second scanning optical system 20B are properly and precisely adjacent to each other side by side without being apart from each other nor overlapping each other in the main scanning direction on the photoconductive surface of the drum 10, and that the scanning spots of the first and second scanning laser beams move in opposite directions apart from each other in the main scanning direction to thereby form a wide scanning line on the photoconductive surface of the drum 10. With the rotational movement of the photoconductive drum 10, which is synchronized to the rotational movement of each of the polygon mirrors 22A and 22B, a series of wide scanning lines are made on the photoconductive surface of the drum 10 to thereby obtain a certain image (charge-latent image) on the photoconductive surface of the drum 10.

As mentioned above, according to the present embodiment, the pair of scanning laser beams emitted respectively from the first and second scanning optical systems 20A and 20B are each incident on the photoconductive surface of the drum 10 in a direction orthogonal to the generatrices of the photoconductive drum 10 at all times, wherever the spot of each of the first and second scanning laser beams is on a scanning line in a corresponding range thereof. Therefore, even if the photoconductive surface of the drum 10 slightly deviates from its original position in a direction close to or away from the first and second scanning optical systems 20A and 20B, the opposing ends of two corresponding scanning lines formed by the pair of scanning laser beams emitted from the first and second scanning optical systems 20A and 20B will not be apart from each other nor overlap each other.

Furthermore, the pair of scanning laser beams emitted from the first and second scanning optical systems 20A and 20B are incident on the photoconductive surface of the drum 10 in the same direction without any inclination therebetween, so that each of the opposing ends of the two corresponding scanning lines formed by the pair of scanning laser beams will not deviate from the other opposing end in the sub-scanning direction even if the photoconductive drum 10 slightly deviates from its original position in a direction close to or away from the first and second scanning optical systems 20A and 20B.

In the present embodiment as noted above, although only one pair of laser scanning optical systems 20A and 20B are used to form a wide scanning line, more than one pair of laser scanning optical systems may be arranged in series in the main scanning direction to form a wider scanning line.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A scanning apparatus having a cascade scanning optical system, comprising:

a first scanning optical system for deflecting a first scanning laser beam to scan a scanning surface;

a second scanning optical system for deflecting a second scanning laser beam to scan said scanning surface, wherein each of said first and second scanning optical systems is a telecentric system;

a beam splitter positioned such that a first portion of said first scanning laser beam which has been reflected by said beam splitter and a first portion of said second scanning laser beam which has passed through said beam splitter proceed to said scanning surface on a common line thereon extending in a main scanning direction in respective different adjacent ranges of said common line to generate a single scanning line on said scanning surface by a combination of said first portion of said first scanning laser beam and said first portion of said second scanning laser beam; and a first laser beam detector fixed at a position to detect a second portion of said first scanning laser beam which has passed through said beam splitter and a second portion of said second scanning laser beam which has been reflected by said beam splitter when said first and second laser beams start scanning said respective different adjacent ranges of said common line.

2. The scanning apparatus according to claim 1, wherein said first laser beam detector comprises a light interceptive plate positioned in front of a light detecting surface of said first laser beam detector, wherein said light interceptive plate comprises two parallel slits which are positioned lie on a line extending in parallel to said main scanning direction.

3. The scanning apparatus according to claim 2, wherein said two parallel slits extend in a direction normal to said main scanning direction.

4. The scanning apparatus according to claim 1, further comprising a drum having said scanning surface on a periphery of said drum.

5. The scanning apparatus according to claim 1, further comprising:

a second laser beam detector fixed at a position to detect said first scanning laser beam before said first scanning laser beam starts scanning one of said respective different adjacent ranges of said common line;

a third laser beam detector fixed at a position to detect said second scanning laser beam before said second scanning laser beam starts scanning the other of said respective different adjacent ranges of said common line;

a first counter which starts counting at the moment said second laser beam detector detects said first scanning laser beam and subsequently stops counting at the moment said first laser beam detector detects said first scanning laser beam to output a first counted time value;

a second counter which starts counting at the moment said first laser beam detector detects said second scanning laser beam and subsequently stops counting at the moment said third laser beam detector detects said second scanning laser beam to output a second counted time value; and a controller for adjusting a first position on said scanning surface at which said first scanning laser beam starts generating a first scanning line in one of said respective different adjacent ranges of said common line, in accordance with said first counted time value, and for adjusting a second position on said scanning surface at which said second scanning laser beam starts generating a second scanning line in the other of said respective different adjacent ranges of said common line, in accordance with said second counted time value, said first and second scanning lines together forming said single scanning line.

6. The scanning apparatus according to claim 1, further comprising a mirror positioned adjacent to said beam splitter to reflect said second scanning laser beam towards one side of said beam splitter in a first direction, wherein said first scanning optical system is arranged relative to said second scanning optical system such that said first scanning laser beam is incident on another side of said beam splitter in a second direction perpendicular to said first direction.

7. The scanning apparatus according to claim 1, wherein said first and second laser scanning optical systems are composed of the same optical elements.

8. The scanning apparatus according to claim 7, wherein said first and second laser scanning optical systems are arranged in parallel to each other.

9. The scanning apparatus according to claim 1, wherein said first scanning optical system comprises a first polygon mirror for deflecting said first scanning laser beam, and wherein said second scanning optical system comprises a second polygon mirror for deflecting said second scanning laser beam.

* * * * *